US009506801B2

United States Patent
Yoshimoto et al.

(10) Patent No.: US 9,506,801 B2
(45) Date of Patent: Nov. 29, 2016

(54) PISTON PROVER

(71) Applicant: OVAL Corporation, Tokyo (JP)

(72) Inventors: Masahito Yoshimoto, Tokyo (JP); Hajime Iida, Tokyo (JP); Koji Atsumi, Tokyo (JP)

(73) Assignee: OVAL Corporation, Tokyo (JP)

( * ) Notice: Subject to any disclaimer, the term of this patent is extended or adjusted under 35 U.S.C. 154(b) by 50 days.

(21) Appl. No.: 14/650,697

(22) PCT Filed: Apr. 18, 2014

(86) PCT No.: PCT/JP2014/061040
§ 371 (c)(1),
(2) Date: Jun. 9, 2015

(87) PCT Pub. No.: WO2015/029494
PCT Pub. Date: Mar. 5, 2015

(65) Prior Publication Data
US 2015/0308882 A1 Oct. 29, 2015

(30) Foreign Application Priority Data

Aug. 28, 2013 (JP) ................................. 2013-176287

(51) Int. Cl.
*G01F 1/22* (2006.01)
*G01P 21/00* (2006.01)
(Continued)

(52) U.S. Cl.
CPC ....... *G01F 25/0007* (2013.01); *G01F 25/0015* (2013.01)

(58) Field of Classification Search
None
See application file for complete search history.

(56) References Cited

U.S. PATENT DOCUMENTS 4,628,724 A * 12/1986 Maurer ............... G01F 25/0015
73/1.17
4,811,252 A * 3/1989 Furuse ................ G01M 3/3263
702/51
(Continued)

FOREIGN PATENT DOCUMENTS

JP 59-044625 3/1984
JP 2008-286761 11/2008
(Continued)

OTHER PUBLICATIONS

Microfilm or the specification and drawings annexed to the request of Japanese Utility Model Application No. 132887/1978 (Laid-open No. 049242/1980) (NKK Corp.), Mar. 31, 1980 (Mar. 31, 1980), entire text; all drawings (Family: none) JP S55-49242 (Mar. 31, 1980).

*Primary Examiner* — Peter Macchiarolo
*Assistant Examiner* — Jermaine Jenkins
(74) *Attorney, Agent, or Firm* — Jordan and Koda, PLLC

(57) ABSTRACT

A prover includes a measurement cylinder; a hydraulic cylinder coupled with a side of a downstream end of the measurement cylinder; a measuring piston that moves through a predetermined distance from an upstream side toward a downstream side through the measurement cylinder to eject a reference volume of fluid; and a piston rod that is movably accommodated in the hydraulic cylinder, and has the measuring piston and the piston rod separately constructed. The prover includes measurement standby position stop means, and when returning the measuring piston to a predetermined measurement standby position, the piston rod moves the measuring piston from the downstream side to the upstream side and the measurement standby position stop means stops the measuring piston at the predetermined measurement standby position, after which only the piston rod is caused to move from the upstream side to the downstream side and is accommodated in the hydraulic cylinder.

15 Claims, 12 Drawing Sheets

(51) Int. Cl.
*G01F 1/38* (2006.01)
*G01F 1/40* (2006.01)
*G01F 25/00* (2006.01)

(56) References Cited

U.S. PATENT DOCUMENTS

| | | | | | |
|---|---|---|---|---|---|
| 5,170,656 | A | * | 12/1992 | Draus | G01F 25/0007 73/1.22 |
| 5,392,632 | A | * | 2/1995 | Umeda | G01F 25/0015 73/1.73 |
| 6,817,252 | B2 | * | 11/2004 | Wiklund | G01F 1/36 73/861.44 |
| 6,848,323 | B2 | * | 2/2005 | Krouth | F15B 15/2838 73/861.47 |
| 8,161,791 | B2 | * | 4/2012 | Ignatian | G01F 25/0015 73/1.19 |
| 8,511,138 | B2 | * | 8/2013 | Larsen | G01F 25/0015 73/1.01 |
| 8,915,115 | B2 | * | 12/2014 | Kuge | G01F 25/0015 73/1.19 |
| 8,950,235 | B2 | * | 2/2015 | Heath | G01F 25/0007 134/22.11 |
| 2012/0186323 | A1 | * | 7/2012 | Weaver | G01F 25/0015 73/1.16 |
| 2012/0260717 | A1 | * | 10/2012 | Van Bekkum | G01F 25/0015 73/1.22 |
| 2013/0091923 | A1 | | 4/2013 | Horikazu et al. | |

FOREIGN PATENT DOCUMENTS

| | | |
|---|---|---|
| JP | 4782236 | 9/2011 |
| JP | 2012-018113 | 1/2012 |
| KR | 1019930008434 | 10/1991 |
| KR | 200240245 | 7/2001 |

\* cited by examiner

FIG.6
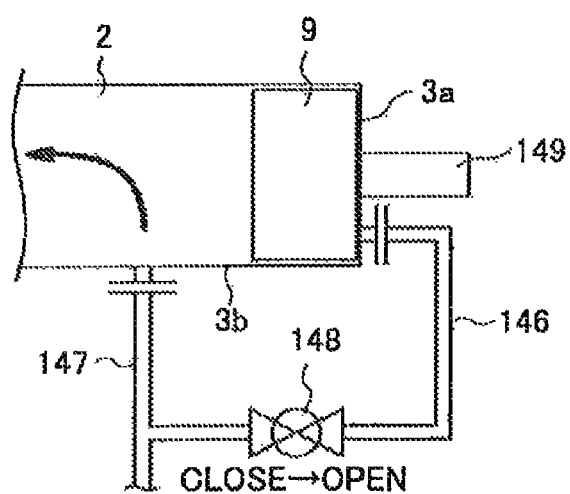
(A)
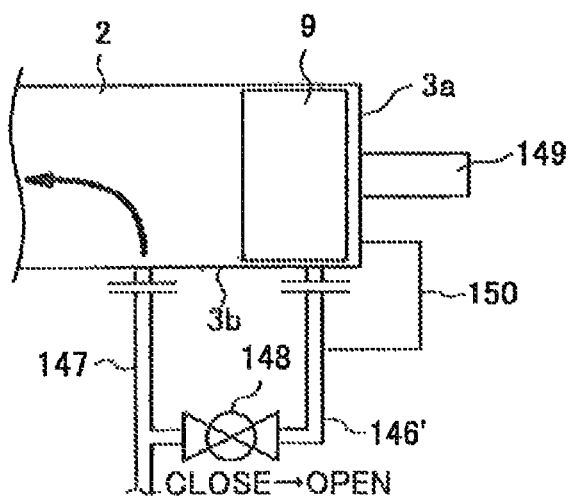
(B)

FIG.11

(A) STANDBY FOR MEASUREMENT, PISTON ROD RETURN MOVEMENT (B) STANDBY FOR MEASUREMENT, PISTON ROD ACCOMMODATION MOVEMENT

PISTON PROVER

TECHNICAL FIELD

The present invention relates to a piston prover and, more particularly, to a piston prover having a reduced reference volume for proving accuracy of a flowmeter.

BACKGROUND OF THE INVENTION

A proving device for proving a flowmeter is a device for subjecting a newly manufactured flowmeter or a flowmeter in use to a characteristic test periodically or at any timing in order for usage at a reliable accuracy regardless of a change in the characteristics attributable to external factors such as temperature and pressure or to internal factors such as abrasion of moving parts. Broadly classified, this characteristic test is carried out by a calibrator that sets a flowmeter to be tested in a fixed tester to perform the test or by a prover type flowmeter tester that sets the flowmeter in a fluid system to perform the test.

Since the prover type can perform the flowmeter characteristic test on line and perform any characteristic test as needed, it is often used in the test of an inferential flowmeter especially susceptible to piping, for example, of a turbine meter. The prover has a moving element such as a piston that moves through a pipe with a constant section in synchronism with a fluid and specifies a fluid ejected by the movement of this moving element through a predetermined interval as a reference volume.

In the flowmeter characteristic test using the prover type, the number of flow pulses sent per unit volume (flow rate coefficient), a so-called K factor is calculated from reading of the flowmeter when a fluid of a reference volume specified by the prover passes therethrough, that is, by detecting the number of flow pulses sent from the flowmeter. Moreover, if necessary, a continuous flow rate characteristic curve is obtained based on the flow rate coefficients in a plurality of flow rates to be measured.

To obtain the flow rate coefficient at a high resolution, the number of flow pulses sent per reference volume needs to be a predetermined number or more and, for example, a specified number of 10,000 pulses or more is given in the case of a large-sized stationary prover having a large reference volume. On the contrary, if the reference volume is reduced, flow pulses of a specified number or more cannot be sent, but the flow rate coefficient can be obtained from a relationship between the reference volume of fluid ejected as a result of movement of the moving element such as the piston and the sent pulses (time) sent from the flowmeter during this time. Accordingly, even in the case of the reduced number of flow pulses, a small-sized prover (small volume prover) is available.

In the above small volume prover (hereinafter, referred to as SVP), a piston prover is known that uses a piston as the moving element. This piston prover has a measurement cylinder with a constant section that is basically connected in series with a flowmeter to be tested and compares the volume of a fluid displaced when the piston moving in the measurement cylinder moves through a certain distance with reading of the flowmeter at that time. The volume of a fluid is actually obtained from an amount of movement of the piston. In the proving, ordinarily, plural times of test results are averaged to calculate the flow rate coefficient (K factor) based on the average value. Consequently, the piston reciprocates by the number of times of the test in the measurement cylinder for each of the flow rates to be measured.

To return the piston to its original position again after completion of measurement by the movement of the piston through a specified interval in the measurement cylinder, the piston is driven against flow of a fluid by an actuator using a hydraulic pressure or a pneumatic pressure via a piston rod, in which for a flow passage allowing a fluid to pass therethrough during this time, there are a case where the measurement cylinder itself is used and a case where a bypass flow passage separately disposed in parallel with the measurement cylinder is used. In the case of causing a fluid to pass through the measurement cylinder, a valve function is provided inside the piston returned by the actuator so that the valve is closed at the time of the measurement and that the valve is opened when the piston is returned. This method is called an internal valve method. Further, in the case of causing a fluid to pass through the bypass flow passage, a bypass valve is disposed in the bypass flow passage so that the valve is closed at the time of the measurement and that the valve is opened at the time of the return. This method is called an external valve method.

Since such an SVP ordinarily has the structure having the piston rod integrally secured to a measuring piston, e.g. when the measuring piston is subjected to a pressure in a rotating direction, there arises a problem that the piston rod works as a resistance to impede the rotation, imposing a load on the measuring piston. In addition, an excessive load on this measuring piston prevents the measuring piston from smoothly moving through the measurement cylinder, making accurate measurement impossible.

On the other hand, for example, a piston prover described in Patent Document 1 is proposed. In this piston prover, a measuring piston and a piston rod are separately constructed, and when returning the measuring piston to a predetermined measurement standby position, the piston rod causes the measuring piston to move from a downstream side to an upstream side. The measuring piston is set at the predetermined measurement standby position, and thereafter only the piston rod is caused to move from the upstream side to the downstream side and is accommodated in a hydraulic cylinder. Thereby, a load on the measuring piston is tried to be reduced.

PRIOR ART DOCUMENT

Patent Document 1: Japanese Patent Publication No. 4782236

SUMMARY OF THE INVENTION

FIG. 13 is a diagrammatical view for explaining operation of the piston prover described in Patent Document 1. FIG. 13(A) depicts a state where the measuring piston is at a home position, FIG. 13(B) depicts a state where the measuring piston is at a measurement standby position, and FIG. 13(C) depicts a state where the measuring piston starts measurement. In the figures, 200 denotes a piston prover, and the piston prover 200 includes a measurement cylinder 201, a hydraulic cylinder 202, a piston rod 203, a measuring piston 204, a flow passage switching valve 205, a measurement starting valve 206, a first cylinder inlet 207 and a second cylinder inlet 208. As described above, the piston rod 203 and the measuring piston 204 are separately constructed.

In FIG. 13(A), both the flow passage switching valve 205 and the measurement starting valve 206 are opened with the measuring piston 204 being set at the home position. A hydraulic pressure is then applied to the piston rod 203 in the hydraulic cylinder 202 to move the piston rod 203 and move the measuring piston 204 to a predetermined upstream measurement standby position for setting the measuring piston 204 at the measurement standby position. The state at this time is depicted in FIG. 13(B). Note that, the piston rod 203 is returned to its original position in the hydraulic cylinder 202.

As depicted in FIG. 13(B), the predetermined measurement standby position is at an intermediate position between the first cylinder inlet 207 and the second cylinder inlet 208. Further, since both the flow passage switching valve 205 and the measurement starting valve 206 are opened, the measuring piston 204 is kept at the measurement standby position by a balance between a pressure of a fluid flown from the first cylinder inlet 207 and a pressure of a fluid flown from the second cylinder inlet 208. In addition, as depicted in FIG. 13(C), when both the flow passage switching valve 205 and the measurement starting valve 206 are closed (measurement starting state), the measuring piston 204 starts to move from an upstream side to a downstream side to start measurement.

However, the above piston prover operates without difficulty when a flow rate is relatively small, but though depending on a size of a cylinder diameter, for example, in the case of flowing with a large flow rate such that a flow velocity is 1 m/s or more, the measuring piston 204 moves from the measurement standby position in some cases even though not in the measurement starting state, that is, both the flow passage switching valve 205 and the measurement starting valve 206 are opened. It is considered that this is caused by that the balance between the pressure of the fluid flown from the first cylinder inlet 207 and the pressure of the fluid flown from the second cylinder inlet 208 is disrupted to push the measuring piston 204 toward the downstream side in the case of the large flow rate. More specifically, though the measurement cylinder 201 is sectioned into two rooms by the measuring piston 204, the fluid flown from the second cylinder inlet 208 flows in an arrow direction (refer to FIG. 13(B)), and therefore the room on the second cylinder inlet 208 side is considered to have a less pressure than that of the room on the first cylinder inlet 207 side.

The present invention was conceived to correct the above points and it is an object thereof to provide a piston prover which enables accurate measurement without imposing an excessive load on the measuring piston and further, even in the case of the large flow rate, by stopping the measuring piston at the predetermined measurement standby position.

To solve the above problems, a first technical means of the present invention is a piston prover comprising a measurement cylinder having an upstream end and a downstream end; a hydraulic cylinder coupled with a side of the downstream end of the measurement cylinder; a measuring piston that moves through a predetermined distance from an upstream side toward a downstream side through the measurement cylinder during measurement due to a fluid flown from the upstream end to eject a reference volume of fluid; and a piston rod that is movably accommodated in the hydraulic cylinder, and having the measuring piston and the piston rod separately constructed, wherein measurement standby position stop portion that stops the measuring piston at a predetermined upstream measurement standby position by closing a flow passage that is positioned on an upstream side of the measuring piston is included, when returning the measuring piston to the predetermined measurement standby position, the piston rod moves the measuring piston from the downstream side to the upstream side and the measurement standby position stop portion stops the measuring piston at the predetermined measurement standby position, after which only the piston rod is caused to move from the upstream side to the downstream side and is accommodated in the hydraulic cylinder the measurement standby position stop portion includes a first cylinder inflow passage that is connected to an upstream side of an upstream end side peripheral portion of the measurement cylinder, a second cylinder inflow passage that is connected to a downstream side of the upstream end side peripheral portion of the measurement cylinder, a bypass tube by which the first cylinder inflow passage and an upstream end cover portion of the measurement cylinder are connected, and a return valve that is provided in the bypass tube, and the predetermined measurement standby position is at a position of the first cylinder inflow passage, and by closing the return valve with the first cylinder inflow passage being blocked by the measuring piston, the measuring piston is stopped.

A second technical means is the piston prover of the first technical means, wherein the measurement standby position stop portion further includes a measurement rod that is provided movably in the upstream end cover portion of the measurement cylinder, and by pushing out the measuring piston by the measurement rod after opening the return valve, the measuring piston is caused to move from the upstream side to the downstream side.

A third technical means is a piston prover comprising a measurement cylinder having an upstream end and a downstream end; a hydraulic cylinder coupled with a side of the downstream end of the measurement cylinder; a measuring piston that moves through a predetermined distance from an upstream side toward a downstream side through the measurement cylinder during measurement due to a fluid flown from the upstream end to eject a reference volume of fluid; and a piston rod that is movably accommodated in the hydraulic cylinder, and having the measuring piston and the piston rod separately constructed, wherein measurement standby position stop portion that stops the measuring piston at a predetermined upstream measurement standby position by closing a flow passage that is positioned on an upstream side of the measuring piston is included, when returning the measuring piston to the predetermined measurement standby position, the piston rod moves the measuring piston from the downstream side to the upstream side and the measurement standby position stop portion stops the measuring piston at the predetermined measurement standby position, after which only the piston rod is caused to move from the upstream side to the downstream side and is accommodated in the hydraulic cylinder, the measurement standby position stop portion includes a first cylinder inflow passage that is connected to an upstream end cover portion of the measurement cylinder, a second cylinder inflow passage that is connected to an upstream end side peripheral portion of the measurement cylinder, a measurement starting valve that is provided in the first cylinder inflow passage, and a measurement rod that is provided movably in the upstream end cover portion of the measurement cylinder, the predetermined measurement standby position is at a position of the first cylinder in flow passage, and by closing the measurement starting valve with the first cylinder inflow passage being blocked by the measuring piston, the measuring piston is stopped, and by pushing out the measuring piston by the measurement rod after opening the measurement starting valve, the measuring piston is caused to move from the upstream side to the downstream side.

A fourth technical means is a piston prover comprising a measurement cylinder having an upstream end and a downstream end; a hydraulic cylinder coupled with a side of the downstream end of the measurement cylinder; a measuring piston that moves through a predetermined distance from an upstream side toward a downstream side through the measurement cylinder during measurement due to a fluid flown from the upstream end to eject a reference volume of fluid; and a piston rod that is movably accommodated in the hydraulic cylinder, and having the measuring piston and the piston rod separately constructed, wherein measurement standby position stop portion that stops the measuring piston at a predetermined upstream measurement standby position by closing a flow passage that is positioned on an upstream side of the measuring piston is included, when returning the measuring piston to the predetermined measurement standby position, the piston rod moves the measuring piston from the downstream side to the upstream side and the measurement standby position stop portion stops the measuring piston at the predetermined measurement standby position, after which only the piston rod is caused to move from the upstream side to the downstream side and is accommodated in the hydraulic cylinder, the measurement standby position stop portion includes a first cylinder inflow passage that is connected to an upstream side of an upstream end side peripheral portion of the measurement cylinder, a second cylinder inflow passage that is connected to a downstream side of the upstream end side peripheral portion of the measurement cylinder, a bypass tube by which the first cylinder inflow passage and an upstream end cover portion of the measurement cylinder are connected, a return valve that is provided in the bypass tube, and a measurement starting valve that is provided in the second cylinder inflow passage, the predetermined measurement standby position in at a position of the first cylinder inflow passage, and by closing the return valve and opening the measurement starting valve the first cylinder inflow passage being blocked by the measuring piston, the measuring piston is stopped, and by opening the return valve and closing the measurement starting valve, the measuring piston is caused to move from the upstream side to the downstream side.

A fifth technical means is the piston prover comprising a measurement cylinder having an upstream end and a downstream end; an hydraulic cylinder coupled with a side of the downstream end of the measurement cylinder; a measuring piston that moves through a predetermined distance from an upstream side toward a downstream side through the measurement cylinder during measurement due to a fluid flown from the upstream end to eject a reference volume of fluid; and a piston rod that is movably accommodated in the hydraulic cylinder, and having the measuring piston and the piston rod separately constructed, wherein measurement standby position stop portion that stops the measuring piston at a predetermined upstream measurement standby position by closing a flow passage that is positioned on an upstream side of the measuring piston is included, when returning the measuring piston to the predetermined measurement standby position, the piston rod moves the measuring piston from the downstream side to the upstream side and the measurement standby position stop portion stops the measuring piston at the predetermined measurement standby position, after which only the piston rod is caused to move from the upstream side to the downstream side and is accommodated in the hydraulic cylinder, the measurement standby position stop portion includes a first cylinder inflow passage that is connected to an upstream side of an upstream end side peripheral portion of the measurement cylinder, a second cylinder inflow passage that is connected to a downstream side of the upstream end side peripheral portion of the measurement cylinder, a first measurement starting valve that is provided in the first cylinder inflow passage, and a second measurement starting valve that is provided in the second cylinder inflow passage, the predetermined measurement standby position is at an intermediate position between the first cylinder inflow passage and the second cylinder inflow passage, and by closing the first measurement starting valve and opening the second measurement starting valve with the measuring piston being at the intermediate position, the measuring piston is stopped, and by opening the first measurement starting valve and closing the second measurement starting valve, the measuring piston is caused to move from the upstream side to the downstream side.

A sixth technical means is the piston prover of the first technical means, wherein the measuring piston has a circumferentially embedded magnetic material, and the measurement cylinder has two detecting portion that detect the magnetic material embedded in the measuring piston at the predetermined distance apart from each other on the upstream side and the downstream side of the measurement cylinder.

A seventh technical means is the piston prover of the first technical means, wherein an openable/closable valve communicating with the external air is provided on both the upstream end and the downstream end of the measurement cylinder.

According to the present invention, an excessive load is not imposed on the measuring piston, and further, even in the case of the large flow rate, the measuring piston can be stopped at the predetermined measurement standby position, thus making it possible to perform accurate measurement.

BRIEF DESCRIPTION OF THE DRAWINGS

FIG. 6 is a view diagrammatically depicting a configuration example of a piston prover according to a third embodiment of the present invention.

FIG. 11 is a view for explaining a standby for measurement operation example of the piston prover according to the present invention.

DETAILED DESCRIPTION OF THE PREFERRED EMBODIMENTS

Preferred embodiments according to a piston prover of the present invention will now be described with reference to the accompanying drawings.

First Embodiment

Figure 1:
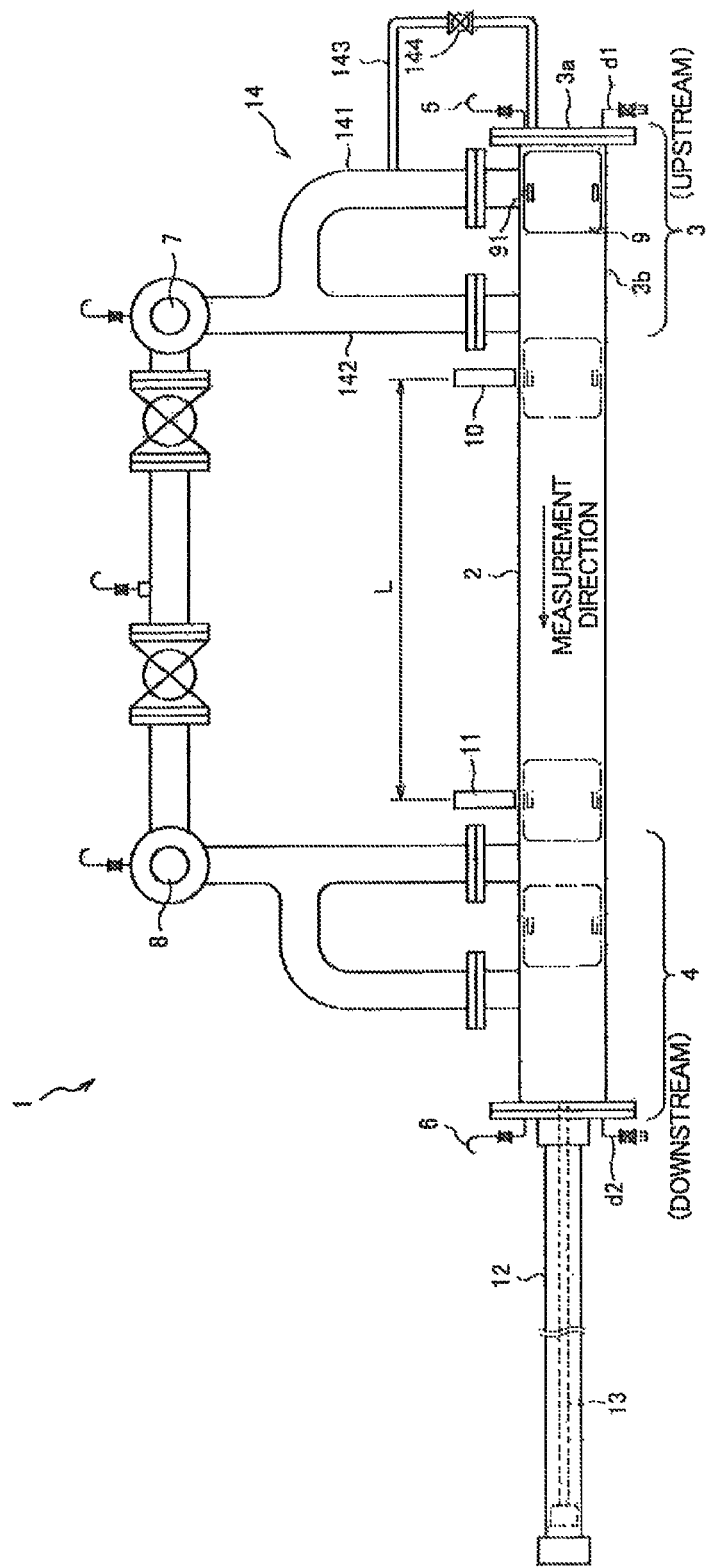
FIG. 1 is a front view depicting an external configuration example of a piston prover according to a first embodiment of the present invention.
Figure 2:
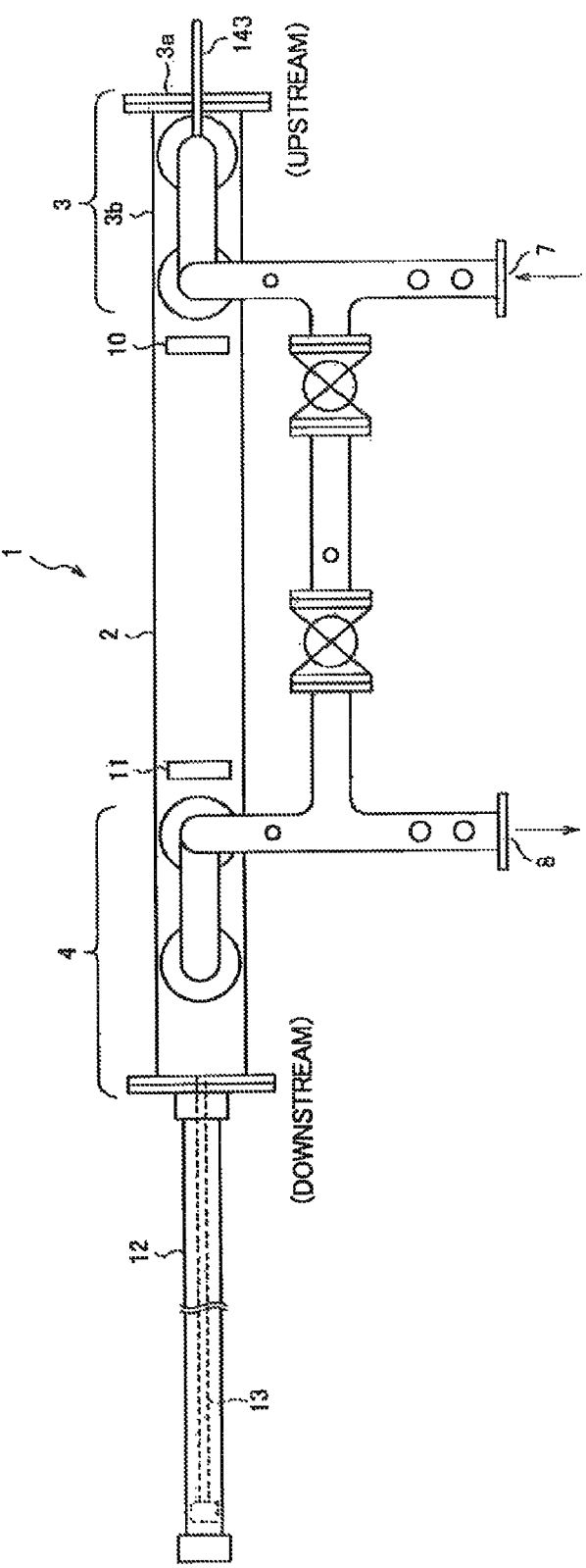
FIG. 2 a top view depicting the external configuration example of the piston prover according to the first embodiment of the present invention.

FIGS. 1 and 2 are views depicting an external configuration example of a piston prover according to a first embodiment of the present invention. FIG. 1 is a front view and FIG. 2 is a top view. In the figures, 1 denotes a piston prover, 2 denotes a measurement cylinder, 3 denotes an upstream end, 4 denotes a downstream end, 5 and 6 denote air vent valves, 7 denotes a fluid inlet, 8 denotes a fluid outlet, 9 denotes a measuring piston, 10 and 11 denote magnetic switches, 12 denotes a hydraulic cylinder, 13 denotes a piston rod, and d1 and d2 denote drains (drain valves).

The piston prover 1 includes the measurement cylinder 2 having the upstream end 3 through which a fluid flows in and the downstream end 4 through which the fluid flows out; the hydraulic cylinder 12 coupled with a side of the downstream end of the measurement cylinder 2; the measuring piston 9 that moves through a predetermined distance L from an upstream side toward a downstream side through the measurement cylinder 2 during measurement due to a fluid flown from the upstream end 3 to eject a reference volume of fluid; and the piston rod 13 that is movably accommodated in the hydraulic cylinder 12. The measuring piston 9 is made of, for example, aluminum and the measurement cylinder 2 is made of, for example, SUS (stainless steel).

The measuring piston 9 is inserted as a moving element into the measurement cylinder 2 and, during the measurement, this measuring portion 9 is caused to move by a fluid pressure of a fluid to be measured to eject a reference volume of fluid. The piston rod 13 is inserted into the hydraulic cylinder 12 and this piston rod 13 is slid through the hydraulic cylinder 12 while being supported in a liquid-tight manner by a journal bearing (not depicted) disposed on an outflow end face plate making up the downstream end 4. The air vent valves 5 and 6 and the drains d1 and d2 are openable/closable valves communicating with the external air and are properly opened/closed according to an action state of the piston prover 1.

The piston prover 1 according to the present invention has the measuring piston 9 and the piston rod 13 separately constructed, and includes measurement standby position stop portion 14 that stops the measuring piston 9 at a predetermined upstream measurement standby position. Moreover, the configuration is such that, when performing a return movement of returning the measuring piston 9 to the predetermined upstream measurement standby position, the piston rod 13 moves the measuring piston 9 from the downstream side to the upstream side and the measurement standby position stop portion 14 stops the measuring piston 9 at the predetermined measurement standby position, after which only the piston rod 13 is caused to move from the upstream side to the downstream side and is accommodated in the hydraulic cylinder 12.

The measurement standby position stop portion 14 of the present embodiment includes a first cylinder inflow passage 141 that is connected to an upstream side of an upstream end side peripheral portion 3b of the measurement cylinder 2, a second cylinder inflow passage 142 that is connected to a downstream side of the upstream end side peripheral portion 3b of the measurement cylinder 2, a bypass tube 143 by which the first cylinder inflow passage 141 and an upstream end cover portion 3a of the measurement cylinder 2 are connected, and a return valve 144 that is provided in the bypass tube 143. In the case of the present example, the predetermined measurement standby position is at a position of the first cylinder inflow passage 141, and the return valve 144 is closed with the first cylinder in flow passage 141 being blocked by the measuring piston 9, thereby stopping the measuring piston 9 at the predetermined measurement standby position. Note that, the measuring piston 9 has only to block the first cylinder inflow passage 141, and may be in contact or not in contact with an inner face of the upstream end cover portion 3a of the measurement cylinder 2.

In addition, the measuring piston 9 has a circumferentially embedded magnetic material 91. At a position which is spaced apart only a predetermined distance L along a longitudinal direction (upstream side and downstream side) of the measurement cylinder 2, the measurement cylinder 2 has the magnetic switches 10 and 11 corresponding to two detecting portion that detect the magnetic material 91 embedded in the measuring piston 9. These two magnetic switches 10 and 11 detect the movement of the measuring piston. 9 through the predetermined distance L. That is, the reference volume is a fluid volume ejected by the movement of the measuring piston 9 through the predetermined distance L. Note that, the predetermined distance L between the magnetic switches 10 and 11 is variable so that the reference volume can be adjusted.

Figure 3:
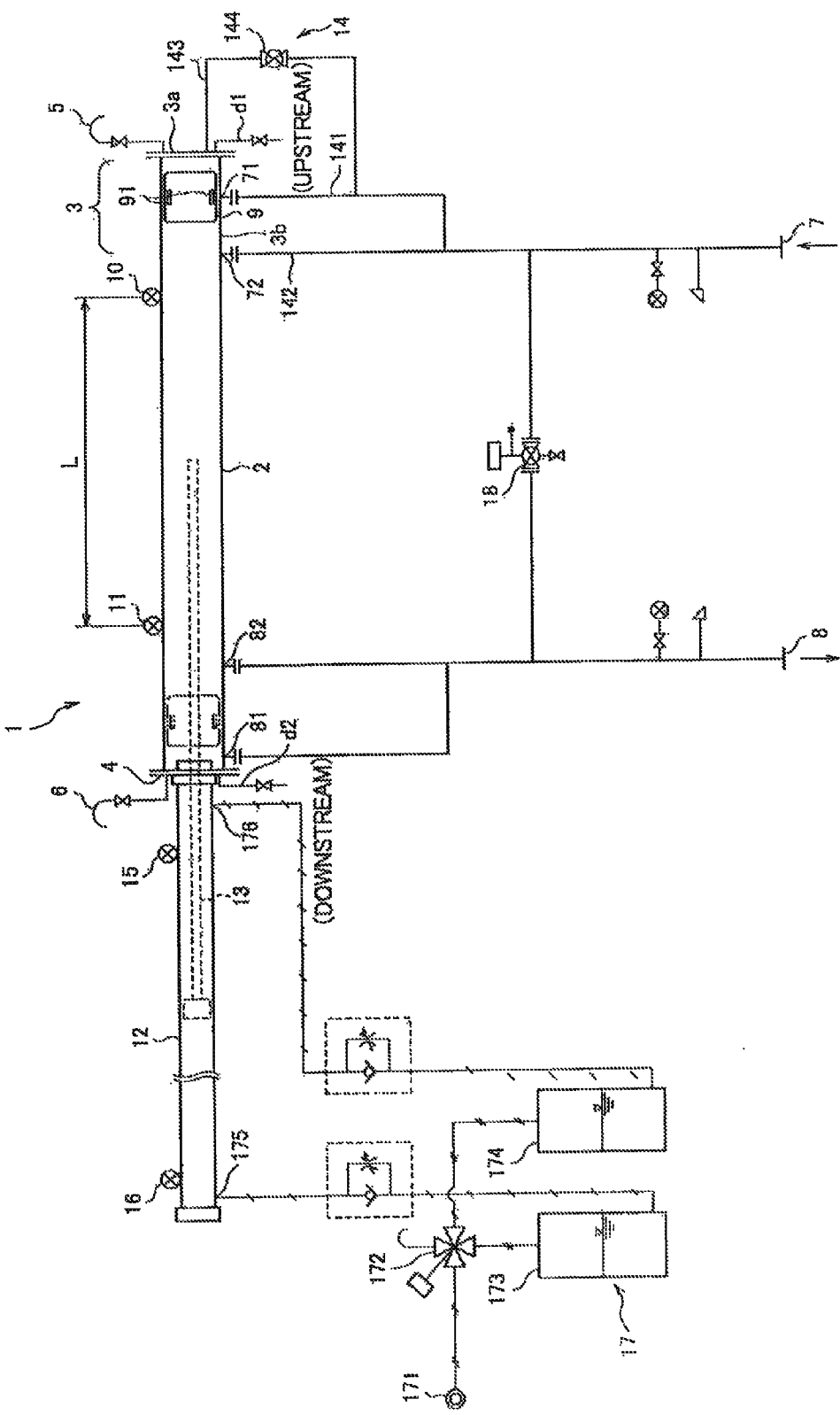
FIG. 3 is a view diagrammatically depicting a configuration example of a providing system including the piston prover according to the first embodiment of the present invention.

FIG. 3 is a view diagrammatically depicting a configuration example of a proving system including the piston prover according to the present invention. In the figure, 15 and 16 denote magnetic switches, 17 denotes a pneumatic/hydraulic pressure converting unit, 18 denotes a flow passage switching valve, 71 denotes a first cylinder inlet, 72 denotes a second cylinder inlet, 81 denotes a first cylinder outlet, and 82 denotes a second cylinder outlet. The fluid inlet 7 is connected to the first cylinder inlet 71 via the first cylinder inflow passage 141 and connected to the second cylinder inlet 72 via the second cylinder inflow passage 142. Further, the fluid outlet 8 is similarly connected to the first cylinder outlet 81 and the second cylinder outlet 82 via a cylinder outflow passage. In addition, the fluid inlet 7 and the fluid outlet 8 are connected to each other via the flow passage switching valve 18.

The pneumatic/hydraulic pressure converting unit 17 is configured to include a pneumatic pressure supply source 171, a switching valve 172 such as a four-way solenoid valve, pneumatic/hydraulic pressure converting portions 173 and 174, and pressure feed ports 175 and 176. A supply destination of a pneumatic pressure from the pneumatic pressure supply source 171 is switched by the switching valve 172 to supply to either the pneumatic/hydraulic pressure converting portion 173 or the pneumatic/hydraulic pressure converting portion 174. The pneumatic/hydraulic pressure converting portion 173 converts the pneumatic pressure supplied from the pneumatic pressure supply source 171 into a hydraulic pressure and supplies the converted hydraulic pressure through the pressure feed port 175 into the hydraulic cylinder 12. This moves the piston rod 13 in a direction being close to the measurement cylinder 2.

Similarly, the pneumatic/hydraulic pressure converting portion 174 converts the pneumatic pressure supplied from the pneumatic pressure supply source 171 into a hydraulic pressure and supplies the converted hydraulic pressure through the pressure feed port 176 into the hydraulic cylinder 12. This moves the piston rod 13 in a direction being away from the measurement cylinder 2. Namely, the pneumatic/hydraulic pressure converting unit 17 is a device that introduces a hydraulic pressure into the hydraulic cylinder 12 or ejects a hydraulic pressure from the interior of the hydraulic cylinder 12 by opening/closing the pressure feed ports 175 and 176 so that the piston rod 13 is moved or kept in the hydraulic cylinder 12. Note that, a hydraulic pump may be used instead of the pneumatic/hydraulic pressure converting unit depending on a port diameter of the measurement cylinder.

Moreover, a magnetic material not depicted is embedded circumferentially around a head portion making up the piston rod 13 so that it can be detected by the two magnetic switches 15 and 16 disposed on an outer periphery of the hydraulic cylinder 12 to locate the position of the piston rod 13 in the hydraulic cylinder 12.

Specifically, except the return movement of returning the measuring piston 9 to the predetermined upstream measurement standby position, the piston rod 13 is in a state of being accommodated in the hydraulic cylinder 12 and, in this state, one end side of the piston rod 13 is positioned in a vicinity of the magnetic switch 16, thus turning the magnetic switch 16 into an on-state. It is therefore specified if the magnetic switch 16 is in the on-state that the piston rod 13 is in the state of being accommodated in the hydraulic cylinder 12. Further, in the above return movement, the piston rod 13 moves in the direction being close to the measurement cylinder 2, thus turning the magnetic switch 16 from on to off. It is therefore specified if the magnetic switch 16 is in the off-state that the return movement causes the piston rod 13 to be in a state of protruding from the hydraulic cylinder 12 into the measurement cylinder 2. Then, when the measuring piston 9 returns to the measurement standby position by this return movement, the magnetic switch 15 turns from off to on.

As described above, the pneumatic/hydraulic pressure converting unit 17 performs a proper hydraulic control according to the state of the piston rod 13 in the hydraulic cylinder 12 so as to move or keep the piston rod 13.

In the piston prover 1 of the present embodiment, as described above, the measuring piston 9 and the piston rod 13 are separately constructed so that during the return movement, the piston rod 13 causes the measuring piston 9 to move from the downstream side to the upstream side. At this time, both the flow passage switching valve 18 and the return valve 144 are opened. Then, the measurement standby position stop portion 14 stops the measuring piston 9 at the predetermined upstream measurement standby position. Specifically, the return valve 144 is closed from an open state with the first cylinder inflow passage 141 being blocked by the measuring piston 9. This stops the measuring, piston 9 at the position of the first cylinder inflow passage 141. Note that, a fluid flows from the second cylinder inflow passage 142. After stopping the measuring piston 9, only the piston rod 13 is then caused to move from the upstream side to the downstream side and is accommodated in the hydraulic cylinder 12.

As described above, the measuring piston 9 after the movement is stopped at the predetermined upstream measurement standby position. In this state, the flow passage switching valve 18 is opened and the return valve 144 is closed. When starting the measurement, then, by closing the flow passage switching valve 18 and opening the return valve 144, a fluid flown from the fluid inlet 7 flows through the bypass tube 143 into the measurement cylinder 2. The pressure of this fluid causes the measuring piston 9 to move to the downstream side to perform measurement.

Figure 13:
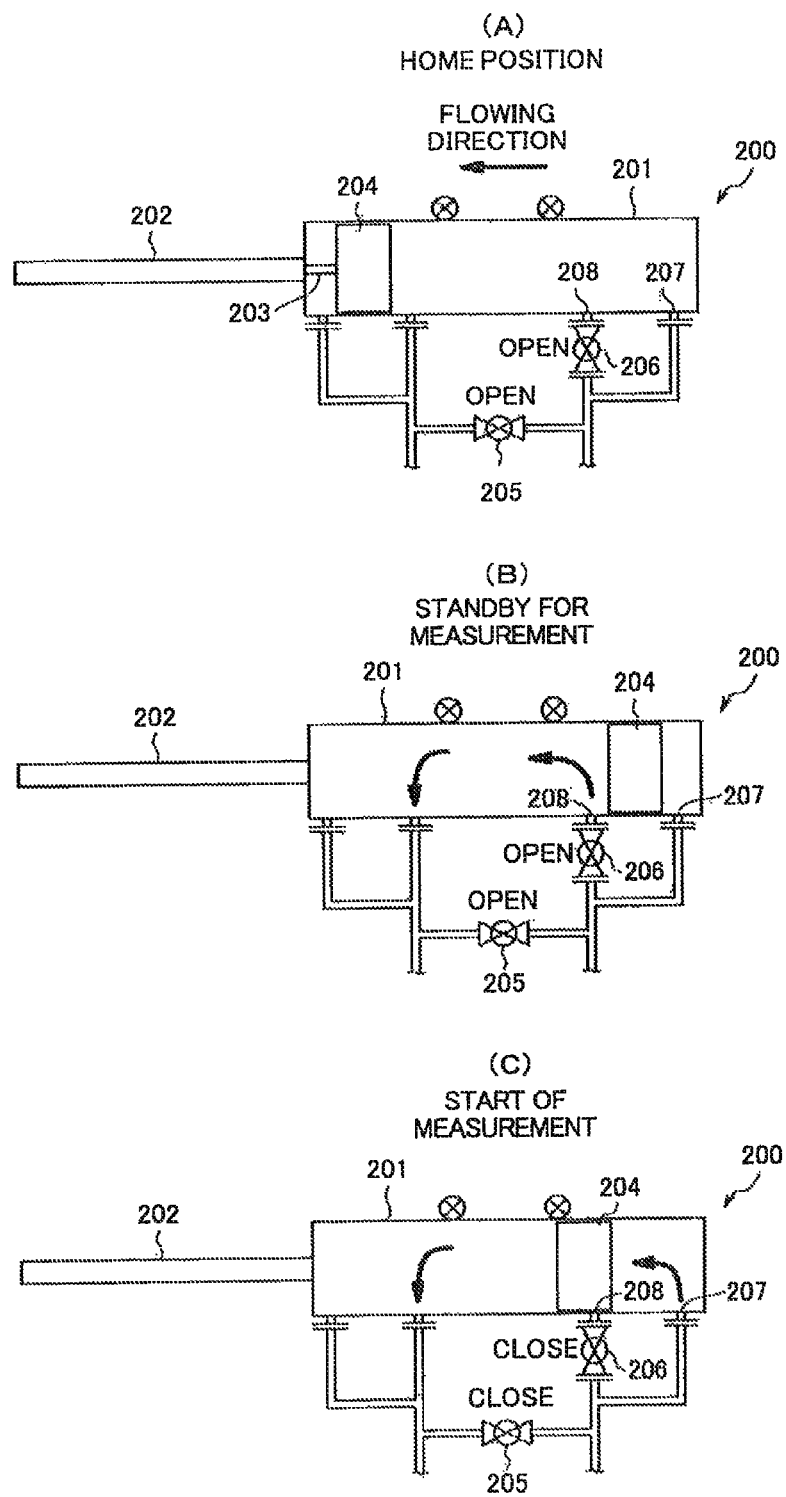
FIG. 13 is a diagrammatical view for explaining operation of a piston prover described in Patent Document 1.

Adoption of the above structure enables a smooth movement of the measuring piston 9 through the measurement cylinder 2 without subjecting the measuring piston 9 to an excessive load even though the measuring piston 9 performs rotation, etc. during the measurement, and further enables a reliable stopping of the measuring piston 9 at the predetermined measurement standby position even in the case of a large flow rate, thus enabling an accurate measurement. Moreover, though a large and expensive measurement starting valve is provided in the second cylinder inflow passage in the structure of FIG. 13 described above, the small and inexpensive return valve 144 may be provided instead of this measurement starting valve in the structure of the present embodiment, thus being advantageous also in terms of cost.

Figure 4:
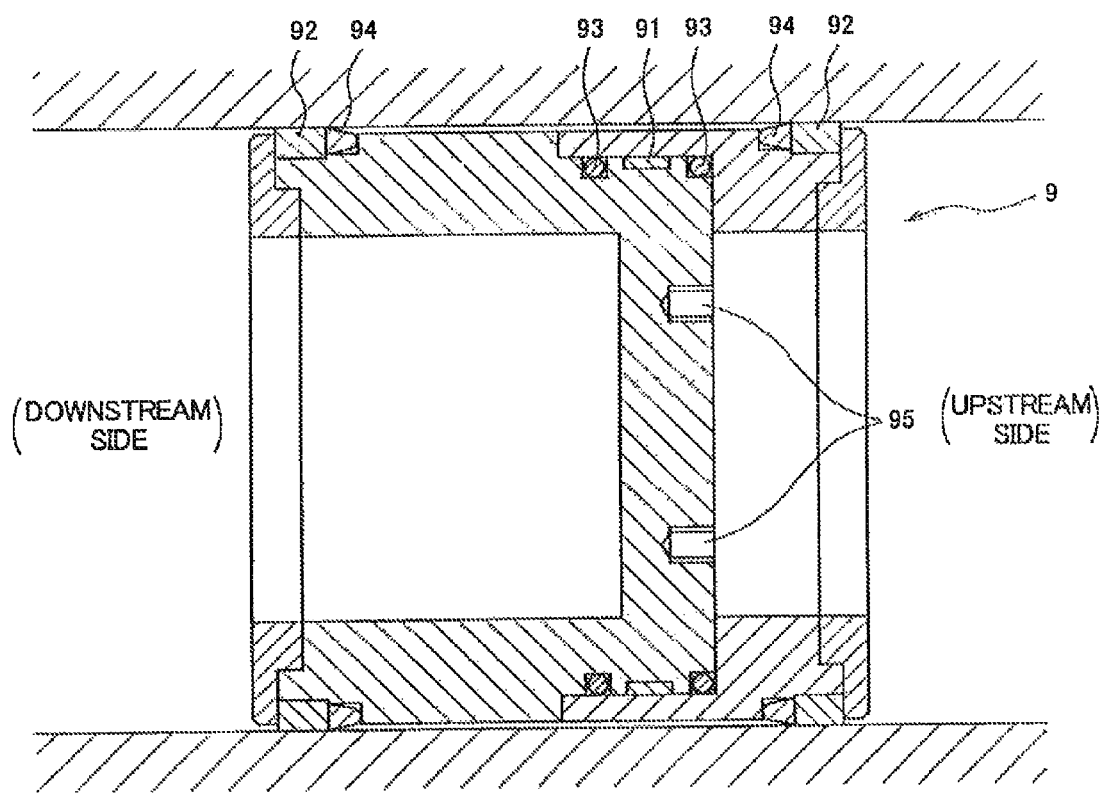
FIG. 4 is a view depicting a configuration example of a measuring piston.

FIG. 4 is a view depicting a configuration example of the measuring piston. The measuring piston 9 includes the magnetic material 91 such as a magnet, a guide ring 92 made of reinforced Teflon (Teflon: registered trademark), etc., an 0 ring 93 made of NBR (nitrile butadiene rubber), etc., a sealing member 94 such as an omni-seal, and a waste tap 95 for piston fitting. In a conventional detection method of a detector signal, the piston rod secured to the measuring piston was made of invar material with a need to groove this invar material or to apply a ceramic coating to the entire invar. Hence, it necessitated processing such as coating surface grinding or attachment of a detector switch, resulting in an increase in the number of manufacturing steps, whereas, the present invention has a simplified configuration where the measuring piston is provided with the magnetic material which is detected by the magnetic switch, thereby enabling a reduction in the number of manufacturing steps.

Further, in FIG. 3, at both the upstream end and the downstream end of the measurement cylinder 2, the piston prover 1 is provided with the air vent valves 5 and 6 as an example of the openable/closable valves communicating with the external air. In addition, either one of the air vent valves 5 and 6 is used to enable a seal check between the measurement cylinder 2 and the measuring piston 9. In a general seal check method, every time the measuring piston performs the return movement, a leak from the omni-seal of the measuring piston and the slide (piston) valve was automatically checked as a differential pressure by applying a pressure to the gap therebetween. In this case, a differential pressure generator is separately needed, resulting in a complicated structure which causes troubles such as failures.

A seal check method of the present embodiment performs the leak check by setting the measuring piston 9, for example, at a predetermined most downstream position of the measurement cylinder 2 and manually operating the air vent valve 6 while applying a pressure of an actual fluid from upstream. Further, reversing upstream and downstream, the leak check may be performed by setting the measuring piston 9 at a predetermined most upstream position of the measurement cylinder 2 and manually operating the air vent valve 5 while applying a pressure of an actual fluid from downstream.

In this manner, according to the above seal check method, there is no need for a part such as the differential pressure generator and it can be checked using only the air vent valve of the measurement cylinder whether a leak occurs, thus enabling a reduction in the number of parts and a reduction in the number of manufacturing steps. Moreover, in the parts replacement at the periodic check, etc., the omni-seal of the measuring piston has only to be replaced, making the maintenance, etc. easy.

Second Embodiment

Figure 5:
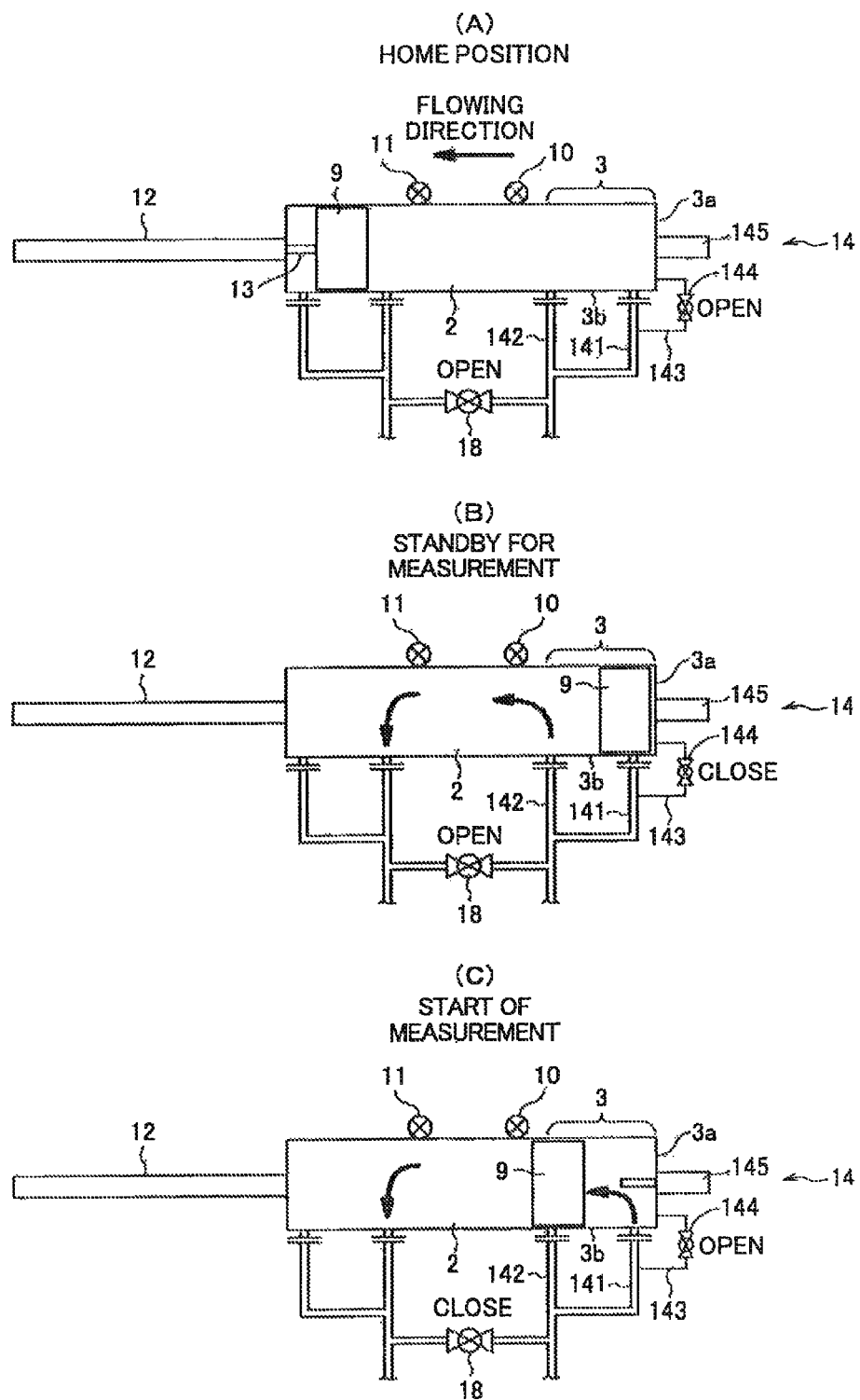
FIG. 5 is a view diagrammatically depicting a configuration example of a piston prover according to a second embodiment of the present invention.

FIG. 5 is a view diagrammatically depicting a configuration example of a piston prover according to a second embodiment of the present invention. FIG. 5(A) depicts a state where the measuring piston is at the home position, FIG. 5(B) depicts a state where the measuring piston is at the measurement standby position, and FIG. 5(C) depicts a state where the measuring piston starts measurement. In the first embodiment described above, in the case of a large flow rate, when the return valve 144 is opened, the measuring piston 9 starts a movement to start measurement, while in the case of a small flow rate, even when the return valve 144 is opened, the measuring piston does not start the movement nor start the measurement in some cases. Thus, in order to make this better, the measurement standby position stop portion 14 of the present embodiment further includes a measurement rod 145 that is provided movably in the upstream end cover portion 3a of the measurement cylinder 2, in addition to the first cylinder inflow passage 141 the second cylinder inflow passage 142, the bypass tube 143 and the return valve 144.

This measurement rod 145 is made of, for example, aluminum. At the time of starting measurement, by pushing out the measuring piston 9 by the measurement rod 145 after opening the return valve 144, the measuring piston 9 is caused to move from the upstream side to the downstream side. This moves the measuring piston 9 smoothly even in the case of a small flow rate, thus making it possible to start the measurement.

In FIG. 5(A), both the flow passage switching valve 18 and the return valve 144 are opened with the measuring piston 9 being set at the home position. A hydraulic pressure is then applied to the piston rod 13 in the hydraulic cylinder 12 to move the piston rod 13 and move the measuring piston 9 to the predetermined upstream measurement standby position, and the measuring piston 9 is stopped at the measurement standby position. Specifically, the return valve 144 is closed from an open state with the first cylinder inflow passage 141 being blocked by the measuring piston 9. This leads to a state where a fluid only from the second cylinder inflow passage 142 flows, and the measuring piston 9 stops at the position of the first cylinder inflow passage 141. After stopping the measuring piston 9, only the piston rod 13 is then caused to move from the upstream side to the downstream side and is accommodated in the hydraulic cylinder 12. The state at this time is depicted in FIG. 5(B).

As described above, the measuring piston 9 stops at the predetermined upstream measurement standby position. In this state, the flow passage switching valve 18 is opened and the return valve 144 is closed. Then, when starting the measurement, as depicted in FIG. 5(C), by closing the flow passage switching valve 18 and opening the return valve 144, a fluid flown from the fluid inlet 7 flows through the bypass tube 143 into the measurement cylinder 2. Here, when the measuring piston 9 does not start to move, the measuring piston 9 may be pushed out by the measurement rod 145. This causes the measuring piston 9 to move to the downstream side to perform measurement.

Third Embodiment

FIG. 6 is a view diagrammatically depicting a configuration example of a piston prover according to a third embodiment of the present invention. In FIG. 6(A), the measurement standby position stop portion 14 includes a first cylinder inflow passage 146 that is connected to the upstream end cover portion 3a of the measurement cylinder 2, a second cylinder inflow passage 147 that is connected to the upstream end side peripheral portion 3b of the measurement cylinder 2, a measurement starting valve 148 that is provided in the first cylinder inflow passage 146, and a measurement rod 149 that is provided movably in the upstream end cover portion 3a of the measurement cylinder 2. Here, the predetermined measurement standby position, at which the measuring piston 9 is stopped is at a position of the first cylinder inflow passage 146, by closing the measurement starting valve 148 with the first cylinder inflow passage 146 being blocked by the measuring piston 9, the measuring piston 9 is stopped, and by pushing out the measuring piston 9 by the measurement rod 149 after opening the measurement starting valve 148, the measuring piston 9 is caused to move from the upstream side to the downstream side. Note that, the flow passage switching valve 18 is opened with the measuring piston 9 being stopped and the flow passage switching valve 18 is closed with the measuring piston 9 being moved.

In the above, the measuring piston 9 stops in an attitude of being in contact with an inner face of the upstream end cover portion 3a of the measurement cylinder 2 as depicted in FIG. 6(A). According to the form of FIG. 6(A), the measurement starting valve 148 is provided in the first cylinder inflow passage 146 instead of the return valve. Moreover, the first cylinder inflow passage 146 is directly connected to the upstream end cover portion 3a of the measurement cylinder 2 and hence the bypass tube is unnecessary.

A modified example of the present embodiment is depicted in FIG. 6(B). In FIG. 6(B), the measurement standby position stop portion 14 includes a first cylinder inflow passage 146 that is connected to the upstream side of the upstream end side peripheral portion 3h of the measurement cylinder 2, the second cylinder inflow passage 147 that is connected to the downstream side of the upstream end side peripheral portion 3b of the measurement cylinder 2, the measurement starting valve 148 that is provided in the first cylinder inflow passage 146, the measurement rod 149 that is provided movably in the upstream end cover portion 3a of the measurement cylinder 2, and a bypass tube 150 by which the first cylinder inflow passage 146' and the upstream end cover portion 3a of the measurement cylinder 2 are connected. Here, by closing the measurement starting valve 148 with the first cylinder inflow passage 146' being blocked by the measuring piston 9, the measuring piston 9 is stopped, and by pushing out the measuring piston 9 by the measurement rod 149 after opening the measurement starting valve 148, the measuring piston 9 is caused to move from the upstream side to the downstream side. Note that, the flow passage switching valve 18 is opened with the measuring piston 9 being stopped and the flow passage switching valve 18 is closed with the measuring piston 9 being moved.

Fourth Embodiment

Figure 7:
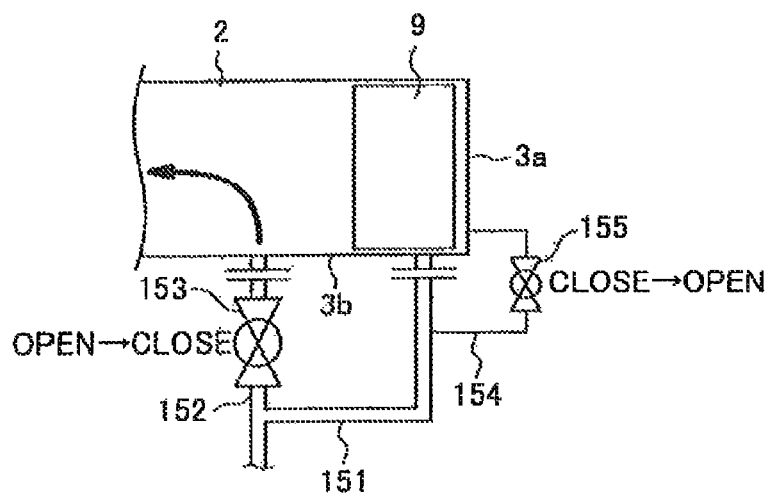
FIG. 7 is a view diagrammatically depicting a configuration example of a piston prover according to a fourth embodiment of the present invention.

FIG. 7 is a view diagrammatically depicting a configuration example of a piston prover according to a fourth embodiment of the present invention. The measurement standby position stop portion 14 includes a first cylinder inflow passage 151 that is connected to the upstream side of the upstream end side peripheral portion em of the measurement cylinder 2, a second cylinder inflow passage 152 that is connected to the downstream side of the upstream end side peripheral portion 3*b* of the measurement cylinder 2, a bypass tube 154 by which the first cylinder inflow passage 151 and the upstream end cover portion 3*a* of the measurement cylinder 2 are connected, a return valve 155 that is provided in the bypass tube 154, and a measurement starting valve 153 that is provided in the second cylinder inflow passage 152. Here, the predetermined measurement standby position at which the measuring piston 9 is stopped is at a position of the first cylinder inflow passage 151. By closing the return valve 155 and opening the measurement starting valve 153 with the first cylinder inflow passage 151 being blocked by the measuring piston 9, the measuring piston 9 is stopped. Further, by opening the return valve 155 and closing the measurement starting valve 153, the measuring piston 9 is caused to move from the upstream side to the downstream side. Note that, the flow passage switching valve 18 is opened with the measuring piston 9 being stopped and the flow passage switching valve 18 is closed with the measuring piston 9 being moved.

The configuration is such that in the present embodiment the measurement rod for pushing out the measuring piston 9 is unnecessary and opening/closing of the measurement starting valve 153 and opening/closing of the return valve 155 are controlled to thereby perform operation of stopping and moving the measuring piston 9.

Fifth Embodiment

Figure 8:
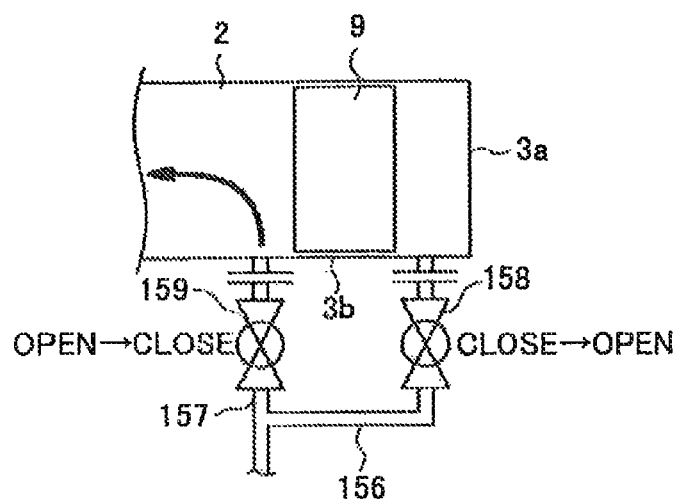
FIG. 8 is a view diagrammatically depicting a configuration example of a piston prover according to a fifth embodiment of the present invention.

FIG. 8 is a view diagrammatically depicting a configuration example of a piston prover according to a fifth embodiment of the present invention. The measurement standby position stop portion 14 includes a first cylinder inflow passage 156 that is connected to the upstream side of the upstream end side peripheral portion 3*b* of the measurement cylinder 2, a second cylinder inflow passage 157 that is connected to the downstream side of the upstream end side peripheral portion 3*b* of the measurement cylinder 2, a first measurement starting valve 158 that is provided in the first cylinder inflow passage 156, and a second measurement starting valve 159 that is provided in the second cylinder inflow passage 157. Here, the predetermined measurement standby position at which the measuring piston 9 is stopped is at an intermediate position between the first cylinder inflow passage 156 and the second cylinder inflow passage 157. By closing the first measurement starting valve 158 and opening the second measurement starting valve 159 with the measuring piston 9 being at this intermediate position, the measuring piston 9 is stopped. Further, by opening the first measurement starting valve 158 and closing the second measurement starting valve 159, the measuring piston 9 is caused to move from the upstream side to the downstream side. Note that, the flow passage switching valve 18 is opened with the measuring piston 9 being stopped and the flow passage switching valve 18 is closed with the measuring piston 9 being moved.

The configuration is such that in the present embodiment the measurement rod for pushing out the measuring piston 9, the bypass tube, and the return valve are unnecessary and opening/closing of the two measurement starting valves 158 and 159 are controlled to thereby perform operation of stopping and moving the measuring piston 9.

Figure 9:
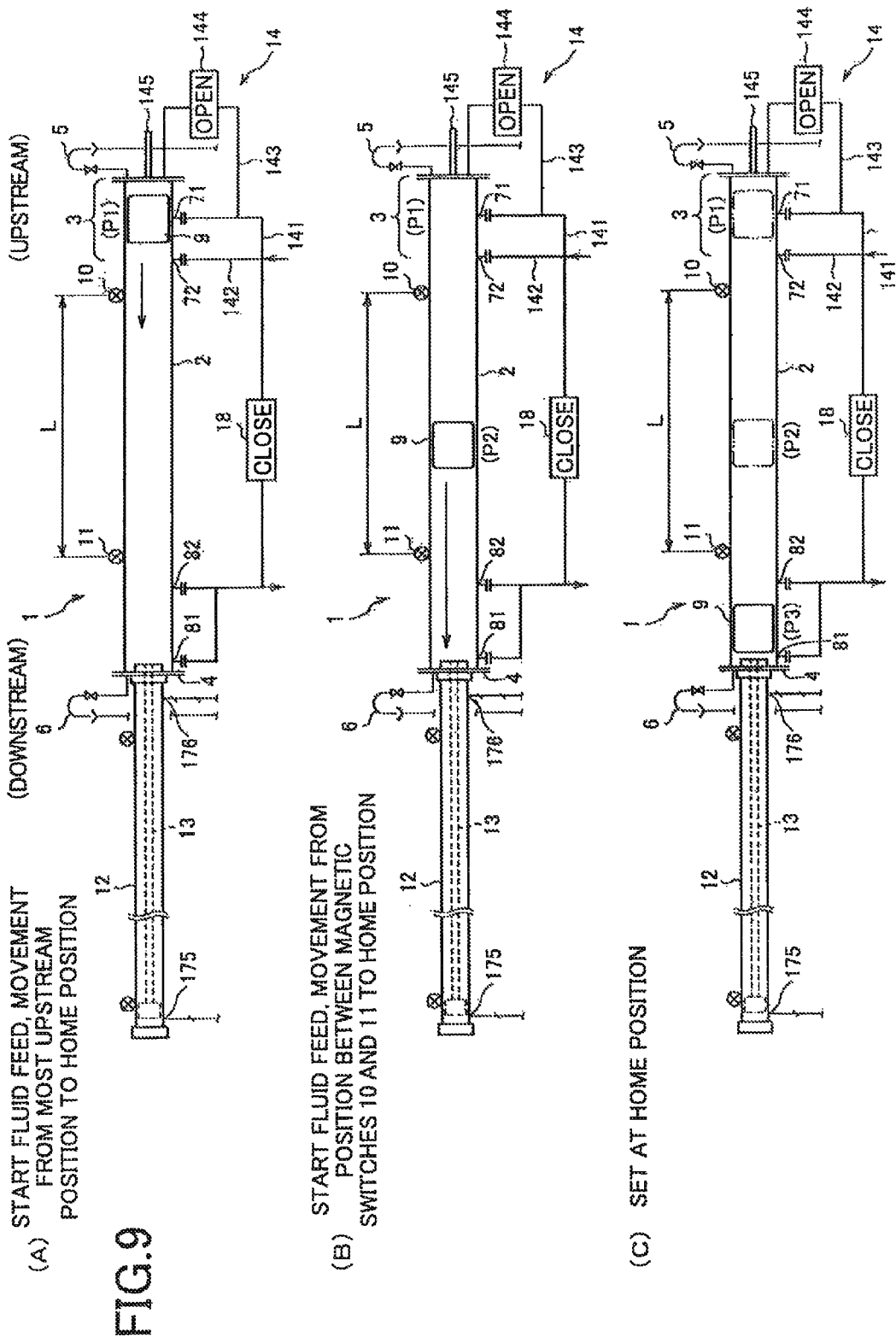
FIG. 9 is a view for explaining an initial movement example of the piston prover according to the present invention.
Figure 10:
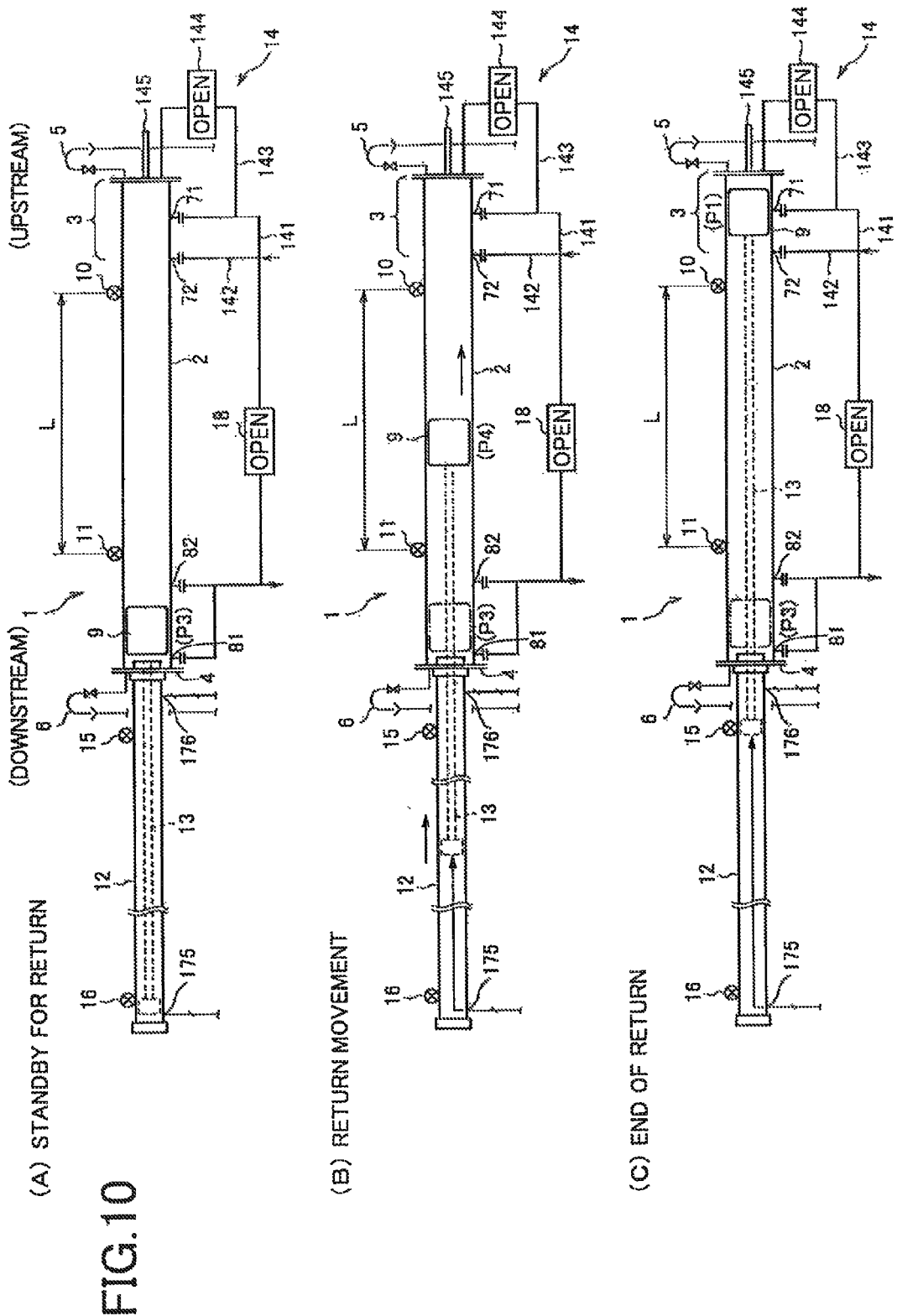
FIG. 10 is a view for explaining a return movement example of the piston prover according to the present invention.
Figure 12:
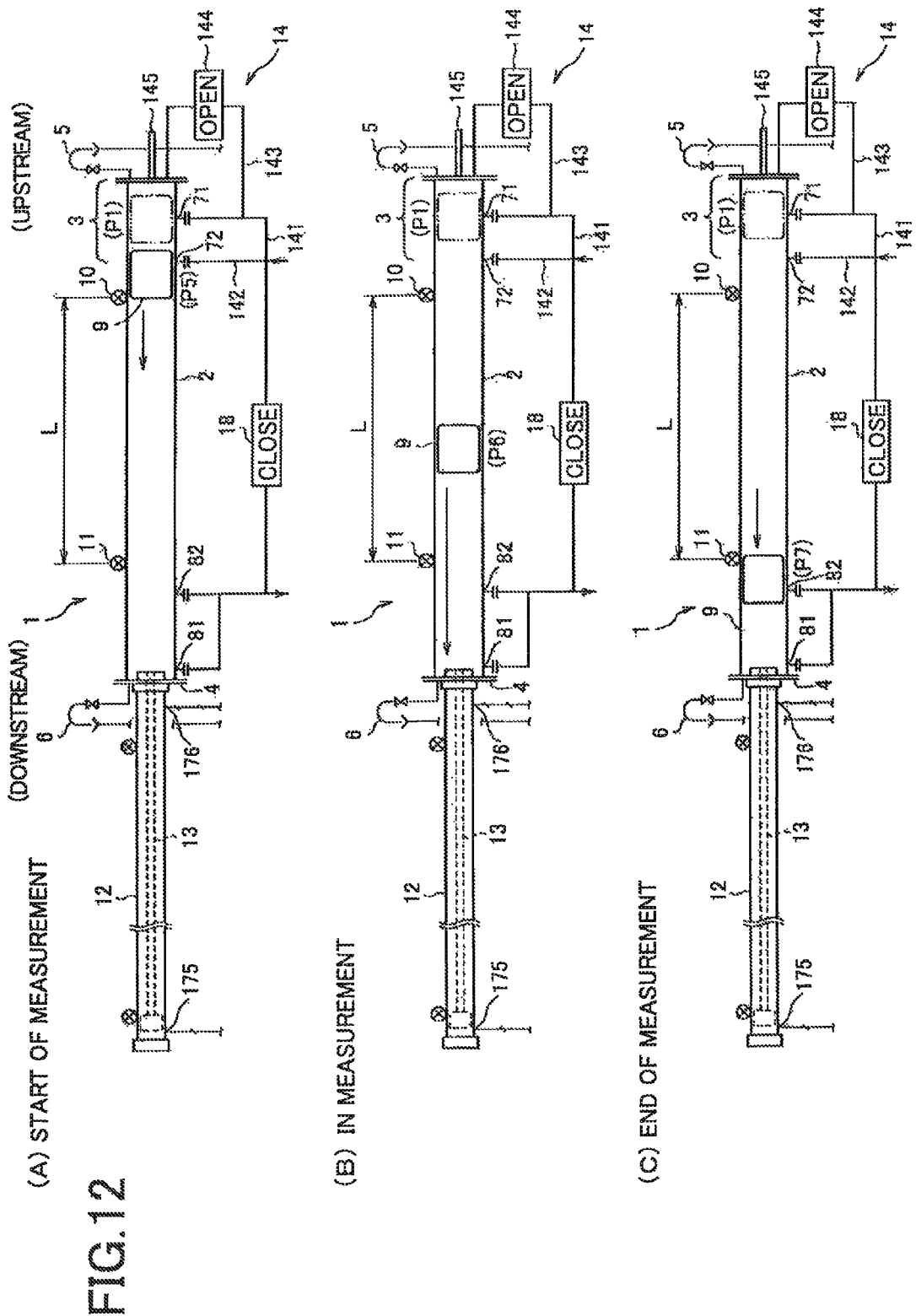
FIG. 12 is a view for explaining a measurement action example of the piston prover according to the present invention.

FIGS. 9 to 12 are views for explaining action examples of the piston prover according to the present invention. FIG. 9 is a view explaining the initial movement, FIG. 10 is a view explaining the return movement, FIG. 11 is a view explaining a standby for measurement operation, and FIG. 12 is a view explaining the measurement action. Note that, here, though the form of the measurement standby position stop portion 14 will be explained by exemplifying the case of the second embodiment (FIG. 5), basic action is the same even in other embodiments.

In the initial movement of FIG. 9, first, when the measuring piston 9 is at a most upstream position (measurement standby position) P1 in starting a fluid feed from the fluid inlet 7, the piston prover 1 closes the flow passage switching valve 18 and opens the return valve 144 to allow a fluid to flow in through the second cylinder inflow passage 142 and the bypass tube 143. As a result, as depicted in FIG. 9(A), the measuring piston 9 moves to the downstream side by the fluid pressure. At this time, when the measuring piston 9 does not start to move, the measuring piston 9 may be pushed out by the measurement rod 145. Note that, the state of FIG. 9(A) is based on the assumption that the interior of the measurement cylinder 2 is not filled with fluid.

In addition, when the measuring piston 9 is at a position P2 between the magnetic switches 10 and 11, the flow passage switching valve 18 is closed and the return valve 144 is opened to allow a fluid to flow in through the second cylinder inflow passage 142, the bypass tube 143, and the first cylinder inflow passage 141. As a result, as depicted in FIG. 9(B), the measuring piston 9 moves to the downstream side by the fluid pressure. Similar to the case of FIG. 9(A), the state of FIG. 9(B) is also based on the assumption that the interior of the measurement cylinder 2 is not filled with fluid.

As depicted in FIG. 9(C), the measuring piston 9 moved as described above is set at a downstream home position P3. In both cases of FIG. 9(A) and FIG. 9(B), the return valve 144 is already opened and hence remains opened also in FIG. 9(C). Note that, in all cases, the flow passage switching valve 18 remains closed. At this home position P3, the measuring piston 9 is kept at substantially an intermediate position between the first cylinder outlet 81 and the second cylinder outlet 82.

In the return movement of FIG. 10, as depicted in FIG. 10(A), the flow passage switching valve 18 is opened with the measuring piston 9 being set at the home position P3. A hydraulic pressure is then applied from the pressure feed port 175 to the piston rod 13 to move the piston rod 13 as depicted in FIGS. 10(B) and (C) to move the measuring piston 9 from the home position P3 to P4 and further to the predetermined upstream measurement standby position P1, and the measurement standby position stop portion 14 stops the measuring piston 9 at the measurement standby position P1. Specifically, the return valve 144 is closed with the first cylinder inlet 71 being blocked by the measuring piston 9. Here, the movement of the piston rod 13 causes the magnetic switch 16 to turn from on to off. Then, when the magnetic switch 15 turns from of to on, it is determined that the measuring piston 9 has moved to the measurement standby position P1. At this measurement standby position P1, the measuring piston 9 is kept at a position of the first cylinder inlet 71.

In the standby for measurement operation of FIG. 11, after the measurement standby position stop portion 14 stops the measuring piston 9 at the predetermined upstream measurement standby position P1, a hydraulic pressure is applied from the pressure feed port 176, opposite to the case of FIG. 10, to the piston rod 13 to return the piston rod 13 to its original position in the hydraulic cylinder 12 as depicted in FIGS. 11(A) and (B). The flow passage switching valve 18 is then closed as depicted in FIG. 11(B) to terminate the standby for measurement. In this state, the measurement cylinder 2 is filled with fluid. Here, the movement of the piston rod 13 causes the magnetic switch 15 to turn from on to off. Then, when the magnetic switch 16 turns from off to on, it is determined that the piston rod 13 has returned to its original position in the hydraulic cylinder 12.

In the measurement action of FIG. 12, when the return valve 144 is opened to allow a fluid to flow in through the bypass tube 143, the measuring piston 9 moves to the downstream side by the fluid pressure as depicted in FIG. 12(A). Note that, when the measuring piston 9 does not start to move, the measuring piston 9 may be pushed out by the measurement rod 145. At this time, when the measuring piston 9 arrives at a position P5, the magnetic switch 10 is turned on to start measurement therefrom. Then, when the measuring piston 9 further moves through a position P6 as depicted in FIG. 12(B) and the measuring piston 9 arrives at a position P7 as depicted in FIG. 12(C), the magnetic switch 11 is turned on. Consequently, the measuring piston 9 is regarded as having ejected a reference volume of fluid, to terminate the measurement. The measuring piston 9 is then set at the home position P3 depicted in FIG. 9(C) above, after which the return movement of FIG. 10, the standby for measurement operation of FIG. 11, and the measurement action of FIG. 12 are iteratively executed a required number of times.

As set forth hereinabove, according to the present invention, by virtue of the separate structure of the measuring piston and the piston rod, the measuring piston can move smoothly through the measurement cylinder without subjecting the measuring piston to an excessive load in measurement, and further the measuring piston can be stopped at the predetermined measurement standby position reliably, thus enabling an accurate measurement. Further, by virtue of the simplified structure as compared with the conventional products, a reduction in the parts count and in cost is achieved.

EXPLANATION OF REFERENCE NUMERALS

1 . . . piston prover, 2 . . . measurement cylinder, 3 . . . upstream end, 3a . . . upstream end cover portion, 3b . . . upstream end side peripheral portion, 4 . . . downstream end, 5, 6 . . . air vent valve, 7 . . . fluid inlet, 71 . . . first cylinder in let, 72 . . . second cylinder inlet. 8 . . . fluid outlet, 81 . . . first cylinder outlet, 82 . . . second cylinder outlet, 9 . . . measuring piston, 91 . . . magnetic material, 92 . . . guide ring, 93 . . . O ring, 94 . . . omni-seal, 95 . . . waste tap for piston fitting, 10, 11, 15, 16 . . . magnetic switch, 12 . . . hydraulic cylinder, 13 . . . piston rod, 14 . . . measurement standby position stop portion, 141, 146, 146', 151, 156 . . . first cylinder inflow passage, 142, 147, 152, 157 . . . second cylinder inflow passage, 143, 150, 154 . . . bypass tube, 144, 155 . . . return valve, 145, 149 . . . measurement rod, 148, 153, 156, 159 . . . measurement starting valve, 17 . . . pneumatic/hydraulic pressure converting unit, 171 . . . pneumatic pressure supply source. 172 . . . switching valve, 173,174 . . . pneumatic/hydraulic pressure converting portion, 175,176 . . . pressure feed port, and 18 . . . flow passage switching valve.

The invention claimed is:

1. A piston prover comprising a measurement cylinder having an upstream end and a downstream end; a hydraulic cylinder coupled with a side of the downstream end of the measurement cylinder; a measuring piston that moves through a predetermined distance from an upstream side toward a downstream side through the measurement cylinder during measurement due to a fluid flown from the upstream end to eject a reference volume of fluid; and a piston rod that is movably accommodated in the hydraulic cylinder, and having the measuring piston and the piston rod separately constructed, wherein measurement standby position stop means that stops the measuring piston at a predetermined upstream measurement standby position is included, and when returning the measuring piston to the predetermined measurement standby position, the piston rod moves the measuring piston from the downstream side to the upstream side and the measurement standby position stop means stops the measuring piston at the predetermined measurement standby position, after which only the piston rod is caused to move from the upstream side to the downstream side and is accommodated in the hydraulic cylinder.

2. The piston prover as defined in claim 1, wherein the measurement standby position stop means includes a first cylinder inflow passage that is connected to an upstream end cover portion of the measurement cylinder, a second cylinder inflow passage that is connected to an upstream end side peripheral portion of the measurement cylinder, a measurement starting valve that is provided in the first cylinder inflow passage, and a measurement rod that is provided movably in the upstream end cover portion of the measurement cylinder, the predetermined measurement standby position is at a position of the first cylinder inflow passage, and by closing the measurement starting valve with the first cylinder inflow passage being blocked by the measuring piston, the measuring piston is stopped, and by pushing out the measuring piston by the measurement rod after opening the measurement starting valve, the measuring piston is caused to move from the upstream side to the downstream side.

3. The piston prover as defined in claim 1, wherein the measurement standby position stop means includes a first cylinder inflow passage that is connected to an upstream side of an upstream end side peripheral portion of the measurement cylinder, a second cylinder inflow passage that is connected to a downstream side of the upstream end side peripheral portion of the measurement cylinder, a bypass tube by which the first cylinder inflow passage and an upstream end cover portion of the measurement cylinder are connected, a return valve that is provided in the bypass tube, and a measurement starting valve that is provided in the second cylinder inflow passage, the predetermined measurement standby position is at a position of the first cylinder inflow passage, and by closing the return valve and opening the measurement starting valve with the first cylinder inflow passage being blocked by the measuring piston, the measuring piston is stopped, and by opening the return valve and closing the measurement starting valve, the measuring piston is caused to move from the upstream side to the downstream side.

4. The piston prover as defined in claim 1, wherein the measurement standby position stop means includes a first cylinder inflow passage that is connected to an upstream side of an upstream end side peripheral portion of the measurement cylinder, a second cylinder inflow passage that is connected to a downstream side of the upstream end side peripheral portion of the measurement cylinder, a first measurement starting valve that is provided in the first cylinder inflow passage, and a second measurement starting valve that is provided in the second cylinder inflow passage, the predetermined measurement standby position is at an intermediate position between the first cylinder inflow passage and the second cylinder inflow passage, and by closing the first measurement starting valve and opening the second measurement starting valve with the measuring piston being at the intermediate position, the measuring piston is stopped, and by opening the first measurement starting valve and closing, the second measurement starting valve, the measuring piston is caused to move from the upstream side to the downstream side.

5. The piston prover as defined in claim 4, wherein the measuring piston has a circumferentially embedded magnetic material, and the measurement cylinder has two detecting means that detect the magnetic material embedded in the measuring piston at the predetermined distance apart from each other on the upstream side and the downstream side of the measurement cylinder.

6. The piston prover as defined in claim 5, wherein an openable/closable valve communicating with the external air is provided on both the upstream end and the downstream end of the measurement cylinder.

7. A piston prover comprising a measurement cylinder having an upstream end and a downstream end; a hydraulic cylinder coupled with a side of the downstream end of the measurement cylinder; a measuring piston that moves through a predetermined distance from an upstream side toward a downstream side through the measurement cylinder during measurement due to a fluid flown from the upstream end to eject a reference volume of fluid; and a piston rod that is movably accommodated in the hydraulic cylinder, and having the measuring piston and the piston rod separately constructed, wherein measurement standby position stop portion that stops the measuring piston at a predetermined upstream measurement standby position by closing a flow passage that is positioned on an upstream side of the measuring piston is included, when returning the measuring piston to the predetermined measurement standby position, the piston rod moves the measuring piston from the downstream side to the upstream side and the measurement standby position stop portion stops the measuring piston at the predetermined measurement standby position, after which only the piston rod is caused to move from the upstream side to the downstream side and is accommodated in the hydraulic cylinder, the measurement standby position stop portion includes a first cylinder inflow passage that is connected to an upstream side of an upstream end side peripheral portion of the measurement cylinder, a second cylinder inflow passage that is connected to a downstream side of the upstream end side peripheral portion of the measurement cylinder, a bypass tube by which the first cylinder inflow passage and an upstream end cover portion of the measurement cylinder are connected, and a return valve that is provided in the bypass tube, and the predetermined measurement standby position is at a position of the first cylinder inflow passage, and by closing the return valve with the first cylinder inflow passage being blocked by the measuring piston, the measuring piston is stopped.

8. The piston prover as defined in claim 7, wherein the measurement standby position stop means includes a first cylinder inflow passage that is connected to an upstream side of an upstream end side peripheral portion of the measurement cylinder, a second cylinder inflow passage that is connected to a downstream side of the upstream end side peripheral portion of the measurement cylinder, a bypass tube by which the first cylinder inflow passage and an upstream end cover portion of the measurement cylinder are connected, and a return valve that is provided in the bypass tube, and the predetermined measurement standby position is at a position of the first cylinder inflow passage, and by closing the return valve with the first cylinder inflow passage being blocked by the measuring piston, the measuring piston is stopped.

9. The piston prover as defined in claim 8, wherein the measurement standby position stop means further includes a measurement rod that is provided movably in the upstream end cover portion of the measurement cylinder, and by pushing out the measuring piston by the measurement rod after opening the return valve, the measuring piston is caused to move from the upstream side to the downstream side.

10. The piston prover as defined in claim 7, wherein the measurement standby position stop portion further includes a measurement rod that is provided movably in the upstream end cover portion of the measurement cylinder; and by pushing out the measuring piston by the measurement rod after opening the return valve, the measuring piston is caused to move from the upstream side to the downstream side.

11. The piston prover as defined in claim 7, wherein the measuring piston has a circumferentially embedded magnetic material, and the measurement cylinder has two detecting portion that detect the magnetic material embedded in the measuring piston at the predetermined distance apart from each other on the upstream side and the downstream side of the measurement cylinder.

12. The piston prover as defined in claim 7, wherein an openable/closable valve communicating with the external air is provided on both the upstream end and the downstream end of the measurement cylinder.

13. A piston prover comprising a measurement cylinder having an upstream end and a downstream end; a hydraulic cylinder coupled with a side of the downstream end of the measurement cylinder; a measuring piston that moves through a predetermined distance from an upstream side toward a downstream side through the measurement cylinder during measurement due to a fluid flown from the upstream end to eject a reference volume of fluid; and a piston rod that is movably accommodated in the hydraulic cylinder, and having the measuring piston and the piston rod separately constructed, wherein measurement standby position stop portion that stops the measuring piston at a predetermined upstream measurement standby position by closing a flow passage that is positioned on an upstream side of the measuring piston is included, when returning the measuring piston to the predetermined measurement standby position, the piston rod moves the measuring piston from the downstream side to the upstream side and the measurement standby position stop portion stops the measuring piston at the predetermined measurement standby position, after which only the piston rod is caused to move from the upstream side to the downstream side and is accommodated in the hydraulic cylinder, the measurement standby position stop portion includes a first cylinder inflow passage that is connected to an upstream end cover portion of the measurement cylinder, a second cylinder inflow passage that is connected to an upstream end side peripheral portion of the measurement cylinder, a measurement starting valve that is provided in the first cylinder inflow passage, and a measurement rod that is provided movably in the upstream end cover portion of the measurement cylinder, the predetermined measurement standby position is at a position of the first cylinder inflow passage, and by closing the measurement starting valve with the first cylinder inflow passage being blocked by the measuring piston, the measuring piston is stopped, and by pushing out the measuring piston by the measurement rod after opening the measurement starting valve, the measuring piston is caused to move from the upstream side to the downstream side.

14. A piston prover comprising a measurement cylinder having an upstream end and a downstream end; a hydraulic cylinder coupled with a side of the downstream end of the measurement cylinder; a measuring piston that moves through a predetermined distance from an upstream side toward a downstream side through the measurement cylinder during measurement due to a fluid flown from the upstream end to eject a reference volume of fluid; and a piston rod that is movably accommodated in the hydraulic cylinder, and having the measuring piston and the piston rod separately constructed, wherein measurement standby position stop portion that stops the measuring piston at a predetermined upstream measurement standby position by closing a flow passage that is positioned on an upstream side of the measuring piston is included, when returning the measuring piston to the predetermined measurement standby position, the piston rod moves the measuring piston from the downstream side to the upstream side and the measurement standby position stop portion stops the measuring piston at the predetermined measurement standby position, after which only the piston rod is caused to move from the upstream side to the downstream side and is accommodated in the hydraulic cylinder, the measurement standby position stop portion includes a first cylinder inflow passage that is connected to an upstream side of an upstream end side peripheral portion of the measurement cylinder, a second cylinder inflow passage that is connected to a downstream side of the upstream end side peripheral portion of the measurement cylinder, a bypass tube by which the first cylinder inflow passage and an upstream end cover portion of the measurement cylinder are connected, a return valve that is provided in the bypass tube, and a measurement starting valve that is provided in the second cylinder inflow passage, the predetermined measurement standby position is at a position of the first cylinder inflow passage, and by closing the return valve and opening the measurement starting valve with the first cylinder inflow passage being blocked by the measuring piston, the measuring piston is stopped, and by opening the return valve and closing the measurement starting valve, the measuring piston is caused to move from the upstream side to the downstream side.

15. A piston prover comprising a measurement cylinder having an upstream end and a downstream end; a hydraulic cylinder coupled with a side of the downstream end of the measurement cylinder; a measuring piston that moves through a predetermined distance from an upstream side toward a downstream side through the measurement cylinder during measurement due to a fluid flown from the upstream end to eject a reference volume of fluid; and a piston rod that is movably accommodated in the hydraulic cylinder, and having the measuring piston and the piston rod separately constructed, wherein measurement standby position stop portion that stops the measuring piston at a predetermined upstream measurement standby position by closing a flow passage that is positioned on an upstream side of the measuring piston is included, when returning the measuring piston to the predetermined measurement standby position, the piston rod moves the measuring piston from the downstream side to the upstream side and the measurement standby position stop portion stops the measuring piston at the predetermined measurement standby position, after which only the piston rod is caused to move from the upstream side to the downstream side and is accommodated in the hydraulic cylinder, the measurement standby position stop portion includes a first cylinder inflow passage that is connected to an upstream side of an upstream end side peripheral portion of the measurement cylinder, a second cylinder inflow passage that is connected to a downstream side of the upstream end side peripheral portion of the measurement cylinder, a first measurement starting valve that is provided in the first cylinder inflow passage, and a second measurement starting valve that is provided in the second cylinder inflow passage, the predetermined measurement standby position is at an intermediate position between the first cylinder inflow passage and the second cylinder inflow passage, and by closing the first measurement starting valve and opening the second measurement starting valve with the measuring piston being at the intermediate position, the measuring piston is stopped, and by opening the first measurement starting valve and closing the second measurement starting valve, the measuring piston is caused to move from the upstream side to the downstream side.

* * * * *